United States Patent

[11] 3,617,509

| [72] | Inventor | Albert L. Hensley, Jr.<br>Munster, Ind. |
|---|---|---|
| [21] | Appl. No. | 839,692 |
| [22] | Filed | July 7, 1969 |
| [45] | Patented | Nov. 2, 1971 |
| [73] | Assignee | Standard Oil Company<br>Chicago, Ill.<br>Continuation-in-part of application Ser. No. 649,847, June 29, 1967, now abandoned. |

[54] CATALYTIC COMPOSITION, METHOD OF PREPARING SAME, AND HYDROCARBON-CONVERSION PROCESS EMPLOYING SAME
22 Claims, No Drawings

| [52] | U.S. Cl. | 208/111, 208/111, 208/120, 252/455 Z |
|---|---|---|
| [51] | Int. Cl. | B01j 11/40, C10g 13/02 |
| [50] | Field of Search | 208/111, 120; 252/455 Z |

[56] References Cited
UNITED STATES PATENTS

| 3,431,196 | 3/1969 | Dobres et al. | 252/455 |
| 3,304,254 | 2/1967 | Eastwood et al. | 208/111 |
| 2,642,384 | 6/1953 | Lox | 208/139 |
| 3,425,956 | 2/1969 | Baker et al. | 252/455 |
| 3,140,253 | 7/1964 | Plank et al. | 208/120 |

Primary Examiner—Delbert E. Gantz
Assistant Examiner—G. E. Schmitkons
Attorneys—Arthur G. Gilkes, William T. McClain and James L. Wilson ABSTRACT: A catalytic composition consisting essentially of an amorphous silica-alumina support having dispersed therein ultrastable, large-pore, substantially metal cation free, crystalline aluminosilicate material, a metal of Group VIA, and at least one metal of Group VIII of the Periodic Table of elements. A method of preparing this catalytic composition which comprises adding ions of the metals to a silica-alumina sol, adjusting the $p^H$ of the composition, precipitating the sulfides of the metals, adding finely divided aluminosilicate material, drying, and calcining the resultant mixture. A hydrocarbon-conversion process employing this catalytic composition, particularly a process for hydrocracking nitrogen-contaminated hydrocarbon fluids.

CATALYTIC COMPOSITION, METHOD OF PREPARING SAME, AND HYDROCARBON-CONVERSION PROCESS EMPLOYING SAME

CROSS-REFERENCE TO RELATED APPLICATION

This is a continuation-in-part application of copending Application Ser. No. 649,847, filed on June 29, 1967, now abandoned.

BACKGROUND OF THE INVENTION

The invention pertains to a catalytic composition which contains an ultrastable, large-pore, crystalline aluminosilicate material which is substantially free of metal cations and which composition includes a Group VIA metal or metal oxide and a Group VIII metal or metal oxide. In addition, the invention pertains to a method of preparing the catalytic composition. The invention pertains further to processes of treating mineral oils which result in a chemical alteration of at least some of the hydrocarbon molecules of the mineral oils to form mineral oils having different properties wherein the mineral oils are treated in a cracking step in the presence of hydrogen.

SUMMARY OF THE INVENTION

Briefly, in accordance with the invention, there is provided an improved catalytic composition for the conversion of petroleum hydrocarbon fractions, a method of preparation of this catalytic composition, and a process for converting nitrogen-contaminated petroleum hydrocarbon fractions, which process employs this catalytic composition. This catalytic composition is particularly useful for hydrocracking nitrogen-containing gas oils.

Broadly, the catalytic composition of this invention comprises an amorphous silica-alumina support having dispersed therein a metallic hydrogenation component and an ultrastable, large-pore, crystalline aluminosilicate material, which aluminosilicate material is substantially free of metal cations. The metallic hydrogenation component may be a mixture of a metal of Group VIA of the Periodic Table of elements and at least one metal of Group VIII. The metals may be present as their oxides.

The preferred metal of Group VIA is molybdenum. The preferred metal of Group VIII is cobalt.

This catalytic composition is prepared by the method which comprises: adding to a silica-alumina sol, a solution of ions of said metal of Group VIA and a solution of ions of said metal of Group VIII to form a first composition; stirring said first composition while adjusting the pH of said first composition to a value within the range between about 5 and about 10; precipitating the sulfide of said metal of Group VIA and the sulfide of said metal of Group VIII to form a second composition; adding an ultrastable, large-pore, crystalline aluminosilicate material in a finely divided state to the second composition; rapidly blending the resulting mixture to form a hydrogel having aluminosilicate crystallites distributed uniformly throughout the hydrogel; drying the hydrogel to form a dried composition having a moisture content between about 10 percent by weight and 40 percent by weight; and calcining the dried material.

The precipitation of the Group VIII metal cations and the Group VIA metal anions as sulfides prevents, in particular, the migration of the metal cations from the amorphous silica-alumina sol onto the surface of the crystalline aluminosilicate material as the latter is dispersed into the sol. Therefore, through the formation of the sulfides, the metal cations are prevented from migrating to the aluminosilicate material to deposit on the surface of the aluminosilicate material and/or base exchange with cations in the aluminosilicate crystal structure.

The catalyst of this invention comprises a metallic hydrogenation component dispersed through an amorphous acidic cracking component and very small ultrastable aluminosilicate crystallites, which are substantially free of metal cations, dispersed uniformly throughout the matrix of the amorphous acidic cracking component. A preferred hydrogenation component is a mixture of the oxides of cobalt and molybdenum. A preferred catalytic composition comprises about 5 to 50 percent by weight of the ultrastable, large-pore, crystalline aluminosilicate material which is substantially free of metal cations dispersed throughout the amorphous acidic cracking component, 2 to 5 percent by weight of cobalt oxide (CoO) and 4 to 15 percent by weight of molybdenum trioxide ($MoO_3$).

The hydrocarbon-conversion process of this invention may be used to convert a nitrogen-contaminated petroleum hydrocarbon stream containing a substantial amount of cyclic hydrocarbons to useful petroleum products, which process comprises contacting the petroleum hydrocarbon stream in a hydrocarbon-conversion zone with a catalytic composition of this invention under hydrocarbon-conversion conditions. Accordingly, a specific embodiment of the process of this invention is a process for the hydrocracking of a nitrogen-contaminated gas oil containing a substantial amount of cyclic hydrocarbons to a lower boiling product. The process of this specific embodiment comprises contacting the gas oil with a catalytic composition of this invention in the presence of a hydrogen-affording gas under hydrocracking conditions, including an average temperature between about 650° F. and about 825° F., and recovering the lower boiling product containing at least about 25 volume percent aromatic hydrocarbons. Hence, this invention provides a process for producing high-octane gasoline blending stock from gas oils containing a substantial amount of cyclic hydrocarbons.

The process conditions employed in the specific embodiment of this invention for hydrocracking are selected so that the hydrocracked product contains at least about 25 volume percent aromatics, preferably at least about 35 volume percent aromatics, optimally above about 40 percent. A particularly suitable catalyst comprises a mixture of cobalt and molybdenum oxides supported on an acidic silica-alumina cracking support having about 5 to 50 percent by weight of the utrastable, large-pore, crystalline aluminosilicate material dispersed in the porous matrix of the silica-alumina cracking support. Preferably, the cracking support is a low-alumina silica-alumina cracking catalyst. The catalyst is preferably contacted with the gas oil and hydrogen at a temperature higher than that normally employed in the industry for hydrocracking, i.e., a temperature in the range of about 650° to 825° F., preferably between about 680° F. and 800° F.

The preferred feedstock for the process of this invention is catalytic cycle oil from fluid catalytic cracking of virgin gas oils and/or light virgin gas oils obtained from naphthenic crudes.

This process is indeed an advance in the art. It advantageously provides significant yields of very-high-octane gasoline-boiling-range materials and naphtha hydrocarbons which may be subjected to further refining processes, such as solvent extraction and reforming. The solvent extraction may be used to separate the high-octane aromatics from the paraffins, and the paraffins obtained therefrom may then be reformed to produce very-high-octane gasoline material without the use of lead containing antiknock compounds. Hence, the process of this invention may be used to aid in the production of high-octane motor fuels which will not result in the introduction of lead compounds into the atmosphere from automobile exhausts to contribute to the pollution of the air in today's highly industrialized and mechanized society.

The surprising success of this invention in producing a high yield of very-high-octane gasoline blending stock at low temperature is due in no small part to the discovery of the particular catalytic composition. As mentioned above, an embodiment of the hydrocarbon-conversion process of this invention is a hydrocracking process. A very effective hydrocracking process is obtained when the gas oil feed to the process is one from which highly aromatic hydrocracked gasoline can be produced. Therefore, the particular catalyst and hydrocracking process conditions employed are quite important. As is pointed out, the hydrocarbon-conversion catalyst of this invention may be employed at a higher hydrocracking temperature than that normally employed in the industry. Surprisingly, this hydrocracking temperature can be employed with this particular catalyst with low catalyst activity decline rate, and sulfur and nitrogen need not be removed from the feed, permitting one-stage hydrocracking to be used.

One-stage hydrocracking employing the catalyst of this invention is a preferred hydrocracking process because of its greater aromatics production and lower equipment requirements, such as fewer reactor pressure vessels.

The hydrocarbon feedstock to be charged to the hydrocracking unit may boil in the range between about 350° F. and about 1,000° F. When operating to maximize gasoline production, the feedstock preferably has an end-point not greater than about 700°–750° F. Typically, a light catalytic cycle oil, or a light virgin gas oil, or mixtures thereof, boiling in the range of from about 350° to 650° F., is employed as a feedstock. The feed may be pretreated to remove compounds of sulfur and nitrogen. However, when the preferred catalyst of the invention is employed, a pretreatment of the feed for removal of the sulfur and nitrogen contaminants is not necessary. The feed may have a significant sulfur content, ranging from 0.1 to 3 weight percent and nitrogen may be present in an amount up to 500 p.p.m. or more. Temperature, space velocity and other process variables may be adjusted to compensate for the effects of nitrogen on the hydrocracking catalyst activity.

The hydrocarbon feed preferably contains a substantial amount of cyclic hydrocarbons, i.e., aromatic and/or naphthenic hydrocarbons, since such hydrocarbons are especially well suited for providing a highly aromatic hydrocracked gasoline product. Advantageously, the feed contains at least about 35–40 percent aromatics and/or naphthenes.

Such a feedstock permits the production of a hydrocracked gasoline product having about 25–30 percent aromatics. A preferred feed is a light catalytic cycle oil containing approximately 40 percent aromatics and 20 percent naphthenes, and with this feed a hydrocracked gasoline product is produced containing about 45–50 percent aromatic hydrocarbons. Paraffins are easily cracked, but produce a lower quality gasoline product. Olefinic naphthas containing light normal olefins may be mixed with the feed, since small amounts of such olefins have been found to be effective in increasing the hydrocracking conversion level.

Typically, the feedstock is mixed with a hydrogen-affording gas and preheated to hydrocracking temperature, then transferred to one or more hydrocracking reactors. Advantageously, the feed is substantially completely vaporized before being introduced into the reactor system. For example, it is preferred that the feed be all vaporized before passing through more than about 20 percent of the catalyst bed in the reactor. In some instances, the feed may be mixed phase vapor-liquid, and the temperature, pressure, recycle, etc. may be then adjusted for the particular feedstock to achieve the desired degree of vaporization.

The catalyst may be present in the hydrocracking reaction zone in fixed-beds, or it may be present as a bed of fluid catalyst.

The feedstock is contacted in the hydrocracking reaction zone with the hereinafter described hydrocracking catalyst in the presence of hydrogen-affording gas. Hydrogen is consumed in the hydrocracking process and an excess of hydrogen is maintained in the reaction zone. Advantageously, a hydrogen-to-oil ratio of at least 5,000 standard cubic feed to hydrogen per barrel of feed (SCFB) is employed, and the hydrogen-to-oil ratio may range up to 20,000 SCFB. Preferably, about 8,000 to 12,000 SCFB is employed. A high hydrogen partial pressure is desirable from the standpoint of prolonging the catalyst activity maintenance.

The hydrocracking reaction zone is operated under conditions of elevated temperature and pressure. The total hydrocracking pressure usually is between about 700 and 3,000 p.s.i.g. and, preferably, between about 1,000 and 1,800 p.s.i.g. The hydrocracking reaction is exothermic in nature and a temperature rise occurs across the catalyst bed. Therefore, the inlet temperature to the hydrocracking reaction zone may be 20°–30° F. lower than the exit temperature. The average hydrocracking catalyst bed temperature is between about 650° F. and 825° F., and preferably a temperature between about 680° F. and 800° F. is maintained. Since the preferred catalyst has been found to have a high initial activity which declines rapidly before leveling out for a run, it may be advantageous to come on stream initially at a temperature between about 500° F. and 600° F., when using fresh catalyst of the preferred type, and then raise the temperature to the above range after the initial catalyst activity decline has occurred. Liquid hourly space velocity (LHSV) typically is between 0.5 and 5 volumes of feed per hour per volume of catalyst; preferably, between 1 and 3 LHSV, and, optimally, 1 to 2 LHSV, are employed.

The hydrocracking catalyst of this invention comprises a metallic hydrogenation component dispersed in an acidic cracking support, which cracking support has dispersed therein also about 5 to 50 percent by weight of an ultrastable, large-pore, crystalline aluminosilicate material, the aluminosilicate material being substantially free of metal cations. A low-alumina silica-alumina cracking catalyst is preferred as the acidic cracking support.

Various aluminosilicates are known in the art. These are both natural and synthetic and may possess pore openings having a wide range of sizes. It is to be understood that the pore openings of the aluminosilicate material of this invention are substantially uniform and are sufficiently large to permit the entrance of all hydrocarbon types and the exit of the various reaction products. Therefore, the dimensions of the pores are in excess of 6 Angstroms.

The ultrastable, large-pore crystalline aluminosilicate material is stable to exposure to elevated temperatures and stable to repeated wetting-drying cycles. Its stability is demonstrated by its surface area after calcination at 1,725° F. After calcination at a temperature of 1,725° F. for a period of 2 hours, there is retained a surface area of greater than 150 M²/gm. Moreover, its stability is demonstrated by its surface area after a steam treatment with an atmosphere of 25 percent steam at a temperature of 1,525° F. for 16 hours. Its surface area after this steam treatment is greater than 200 M²/gm.

The ultrastable, large-pore crystalline aluminosilicate material exhibits extremely good stability toward wetting, which is defined as that ability of a particular aluminosilicate material to retain surface area or nitrogen absorption capacity after contact with water or water vapor. A sodium-form of the ultrastable, large-pore crystalline aluminosilicate material (about 2.15 weight percent sodium) was shown to have a loss in nitrogen absorption capacity that is less than 2 percent per wetting when tested for stability to wetting by subjecting the material to a number of consecutive cycles, each cycle consisting of a wetting and a drying.

The ultrastable, large-pore crystalline aluminosilicate material employed in the catalytic composition of this invention exhibits a cubic unit cell dimension and hydroxyl infrared bands that distinguish it from other aluminosilicate materials.

The cubic unit cell dimension of the ultrastable, large-pore crystalline aluminosilicate material is within the range of about 24.20 Angstrom units to about 24.55 Angstrom units.

The hydroxyl infrared bands obtained with the ultrastable, large-pore crystalline aluminosilicate material are a band near 3,750 cm.¹¹, a band near 3,700 cm.¹¹, and a band near 3,625 cm.¹¹. The band near 3,750 cm.¹¹ may be found on many of the hydrogen-form and decationized aluminosilicate materials, but the band near 3,700 cm.¹¹ and the band near 3,625 cm.¹¹ are characteristic of the ultrastable, large-pore crystalline aluminosilicate material that is employed in the catalytic composition of the present invention.

The ultrastable, large-pore crystalline aluminosilicate material is also characterized by an alkali metal content of less than 1 percent.

An example of the ultrastable, large-pore crystalline aluminosilicate material is Z-14US, which is described in U.S. Pat. No. 3,293,192.

As has been stated above, the ultrastable, large-pore, crystalline aluminosilicate material of the catalytic composition of this invention is substantially free of metal cations. The Group VIII metal cations are tied up as the sulfides during the preparation of the catalytic composition of the invention and hence will not be transferred to the aluminosilicate material when the latter is added to the amorphous acidic cracking component. For example, if the Group VIII metal is the preferred cobalt, the solubility of CoS in a solution having a pH as low as 5 and saturated with $H_2S$ (0.1 m.) is very low and would give a $Co^{++}$ ion concentration of no more than $10^{110}$ molar. It is to be noted that the pH of the silica-alumina sol should be maintained between 5 and 10, since a pH outside this range will deleteriously affect the stability of the aluminosilicate material or the surface area of the catalytic composition.

The aluminosilicate material may be present in any suitable amount, and typically about 5 to 50 percent by weight of aluminosilicate is employed in preparing the hydrocarbon-conversion catalyst of this invention. The preferred catalytic composition contains about 10 to 40 percent by weight of the ultrastable aluminosilicate material. The catalytic composition may be prepared as described herein and formed into pellets or extrudates.

The preferred hydrogenation component is a mixture of cobalt and molybdenum oxides which provides an especially durable long-life catalyst, particularly well suited for hydrocracking virgin gas oils or catalytic cycle oils containing appreciable quantities of sulfur and nitrogen compounds. Typically, the catalyst contains from about 4 to 15 percent by weight of molybdenum trioxide and from about 2 to 5 percent by weight of cobalt oxide. The catalytic composition is prepared by reducing the aluminosilicate material to a small particle size and intimately admixing it with the sol of the amorphous matrix material, which already contains the sulfides of the hydrogenation metals. Then, the aluminosilicate-containing, metal-containing hydrosol or hydrogel is dried and may be shaped into the desired form.

DESCRIPTION OF PREFERRED EMBODIMENTS

The operation of the process and the capabilities of the catalytic composition of the present invention and additional advantages thereof will be understood from the following description and examples of the invention.

EXAMPLE I

An embodiment of the catalytic composition of the present invention was prepared in the following manner.

An ammonium molybdate solution was prepared by dissolving 18.6 gm. of ammonium molybdate, $(NH_4)Mo_7O_24\cdot4H_2)$, in 200 ml. of distilled water. This ammonium molybdate solution was added to a 1,000-gram portion of a high-alumina silica-alumina sol, supplied by the American Cyanamid Company, and the resulting composition was mixed for one-half hour. This silica-alumina sol contained 89.7 percent water and 10.3 percent solids.

A saturated solution of cobalt formate was prepared by dissolving 6.0 gm. of cobalt formate, $Co(CHO_2)_2\cdot4H_2O$, in 120 ml. of distilled water. A nickel acetate solution was prepared by dissolving 3.0 gm. of nickel acetate, $Ni(C_2H_3O_2)_2\cdot4H_2O$, in 100 ml. of distilled water. These solutions were added then to the mixture and the resulting composition was stirred for 30 minutes. The pH of this mixture was originally 5.6. While the stirring was being performed, the pH of the resultant slurry was raised to 7.5 by adding a concentrated ammonium hydroxide solution.

At the end of the stirring, about 25 cc. of a 22 percent ammonium polysulfide solution was added to and mixed with the above slurry to precipitate the cobalt, nickel, and molybdenum as sulfides.

A slurry of the ultrastable aluminosilicate material was prepared by adding 25 gm. of ultrastable, large-pore, crystalline aluminosilicate material in a finely-divided state to 200 ml. of distilled water. This aluminosilicate material is substantially free of metal cations. The resulting mixture was blended for about 1 minute in a high-speed blender and then added to the above sulfided slurry. The resulting blended composition was dried at room temperature in static air and subsequently pulverized. The resulting powder was mixed with about 4 wt. percent Sterotex and pelleted into ⅛ inch× ⅛ inch pills. These were placed in a muffle furnace at room temperature, gradually heated to a temperature of 1,050° F. over a period of 4 hours, and then calcined at this temperature in air for 4 hours.

Samples of the above-prepared catalyst were tested for crushing strength, bulk density and surface area. The crushing strength was found to be 18 lbs. and the bulk density was determined as 0.7 gm./cc. The surface area was 465 $M^2$/gm.

It was estimated that the above catalyst contained 10.2 wt.% $MoO_3$, 1.7 wt.% CoO, 0.6 wt.% NiO, 17.2 wt.% ultrastable aluminosilicate material and 70.3 % wt.% It is identified hereafter as catalyst A and is a specific embodiment of the catalyst of this invention.

EXAMPLE II

A portion of catalyst A was ground to a 20- to 35-mesh material. A 5.6-gm. fraction of this ground material was placed in the reactor of a bench-scale test unit employing a reactor fabricated from ⅜-inch I.D. stainless steel tubing. A ⅛-inch O.D. coaxial thermowell extended along the length of the reactor. The catalyst bed in the reactor had a length of about 6 inches. The reaction conditions included a hydrogen partial pressure of about 1,200 p.s.i.g.; a LHSV of about 1.0 volume of hydrocarbon per hour per volume of catalyst; a total pressure of about 1,250 p.s.i.g; a throughput ratio (TPR) of 1.3 volumes of total feed per volume of fresh feed; and a hydrogen addition rate of 10,000 SCFB.

The hydrocarbon feedstock used was a 70-30 blend of a light catalytic cycle oil (LCCO) and a light virgin gas oil (LVGO). Properties of this feedstock are presented in table II.

TABLE II

| | |
|---|---|
| Gravity, °API | 27.6 |
| Surphur, wt. % | 0.26 |
| Nitrogen, p.p.m. by wt. | 160 |
| Type Analysis, vol. % | |
| paraffins + naphthenes | 53.0 |
| olefins | 2.0 |
| aromatics | 45.0 |
| ASTM distillation, °F. | |
| IBP | 398 |
| 10% | 476 |
| 30% | 506 |
| 50% | 533 |
| 70% | 563 |
| 90% | 614 |
| EBP | 632 |

The data which were obtained from this test are presented in Table III. The activity of the catalyst is expressed in terms of the temperature necessary to produce 100 percent conversion of the hydrocarbons that have been charged to the unit. Gas-chromatographic methods were used to analyze the liquid product which was obtained from the test. Under the heading "Product Distribution" is presented a typical analysis of liquid product obtained from this test. The data presented were obtained from a 24-hour accumulated sample taken during the 14th day of the test.

TABLE III

Activity Data Obtained with Catalyst A

| Days on Oil | Temperature for 100% Conv., °F. |
|---|---|
| 4 | 702 |
| 5 | 701 |
| 6 | 701 |
| 7 | 703 |
| 8 | - |
| 9 | 705 |
| 10 | 705 |
| 11 | 705 |
| 12 | 705 |
| 13 | 705 |

Product Distribution Obtained with Catalyst A

| Component | Wt.% |
|---|---|
| Hydrogen (estimated) | −3.00 |
| Methane | 0.04 |
| Ethane | 0.65 |
| Propane | 3.69 |
| i-Butane | 6.68 |
| n-Butane | 4.22 |
| i-Pentane | 10.40 |
| n-Pentane | 1.12 |
| $C_6$–360° F. Naphtha | 76.40 |

EXAMPLE III

A second catalyst was prepared in the following manner. An ammonium molybdate solution was prepared by dissolving 12.6 gm. of $(NH_4)_6Mo_7O_{24} \cdot 4H_2O$ in 70 ml. of distilled water. This solution had a $_pH$ of 6.0. This ammonium molybdate solution was added to 100 grams of an aluminosilicate-containing catalyst prepared by the Davison Chemical Company, a Division of W. R. Grace and Co. This particular catalyst was composed of about 17 wt. percent of the ultrastable aluminosilicate material Z-14US dispersed in the matrix of a low-alumina silica-alumina. The addition of ammonium molybdate solution to the solid material was carried out with stirring and the resultant composition was dried in static air at room temperature overnight.

A solution of cobalt formate was added then to the molybdate-impregnated composition. The cobalt formate solution was prepared by dissolving 6.0 gm. of $Co(CHO_2)_2 \cdot 2H_2O$ in 120 ml. of distilled water. The resulting composition was dried in static air at room temperature overnight. The resultant dried material was then mixed with about 3 wt. percent Sterotex and then formed into ⅛ inch X⅛ inch pills. The pills were then calcined in air at 1,000° F. for 2 hours. This finished catalytic composition was found to have a surface area of 353 $M^2/gm$.

It was estimated that the above catalyst contained 2.5 wt.% CoO, 10 wt.% $MoO_3$, 17 wt.% ultrastable aluminosilicate material, and about 70.5 wt.% low-alumina silica-alumina. It is identified hereafter as catalyst B.

EXAMPLE IV

A portion of catalyst B was ground to a 20- to 35-mesh material. A 5.6-gram fraction of this ground material was placed in a reactor of the above-described bench-scale test unit and the conditions described above were employed during the test. The same hydrocarbon feedstock was charged to the test unit.

The data obtained during this test with catalyst B are presented in Table IV. Again the data are divided into activity data and data representing the product distribution obtained from a 24-hour accumulated sample, which was obtained during the 14th day of the test.

TABLE IV

Activity Data Obtained with Catalyst B

| Days on Oil | Temperature for 100% Conv., °F. |
|---|---|
| 3 | 720 |
| 4 | 718 |
| 5 | 718 |
| 6 | 719 |
| 7 | 719 |
| 8 | 720 |
| 9 | - |
| 10 | - |
| 11 | 722 |
| 12 | 723 |
| 13 | 725 |
| 14 | 724 |
| 15 | 725 |

Product Distribution Obtained with Catalyst B

| Component | Wt.% |
|---|---|
| Hydrogen (estimated) | −3.00 |
| Methane | 0.03 |
| Ethane | 0.45 |
| Propane | 3.56 |
| i-Butane | 6.90 |
| n-Butane | 4.30 |
| i-Pentane | 10.55 |
| n-Pentane | 1.13 |
| c6–360° F. Naphtha | 76.20 |

A comparison of the data in Table IV with the data in Table III reveals: (1) the activity of the catalyst of this invention (catalyst A) is much greater than the activity of the catalyst B; and (2) the composition of the liquid product obtained with catalyst A was quite similar to the composition of the liquid product obtained with catalyst B. Therefore, the catalyst of this invention, catalyst A, furnishes an improved activity for hydrocracking without reduced selectivity.

EXAMPLE V

In this example, nine (9) catalysts were prepared according to the methods of preparation presented hereinafter and each catalytic composition was examined by X-ray diffraction to determine whether any difference existed in the patterns and, if so, whether there was a correlation between the differences and methods of preparation. These catalysts were identified as Catalysts C, D, E, F, G, H, I, J, and K.

A catalytic composition comprising ultrastable, large-pore crystalline aluminosilicate material suspended in a matrix of catalytically active alumina was prepared. A 1,000-gram portion of an alumina sol, containing 10 weight percent alumina solids and obtained from the American Cyanamid Company, was mixed in a high-speed blender with 50 grams of ultrastable, large-pore crystalline aluminosilicate material in a finely divided state. The ultrastable, large-pore crystalline aluminosilicate material had been cation exchanged previously with a solution of ammonium chloride, washed thoroughly with warm distilled water (about 140° F.) to remove chloride anions, dried in static air at room temperature for at least 16 hours, and calcined in static air at 500° C. (932° F.) for a period of time of about 2 hours. Conventional cation-exchange techniques were employed. The blend of ultrastable, large-pore crystalline aluminosilicate material and alumina hydrosol was treated with a very dilute ammonium hydroxide solution to form a gel. The gel was dried subsequently in static air to a composition containing about 60 weight percent solids, ground to pass through a 10-mesh screen (U.S. Sieve), and then calcined in static air for 1 hour at a temperature of 500° C. (932° F.). This composition was prepared to contain about 35 weight percent ultrastable, large-pore aluminosilicate material and was identified as Catalyst C.

A commercially prepared catalyst was used. It had a catalyst support comprising 35 weight percent ultrastable, large-pore crystalline aluminosilicate material suspended in a porous matrix of a low-alumina (about 13 weight percent alumina) silica-alumina material. Cobalt and molybdenum were impregnated into this catalyst support by means of a solution of cobalt acetate and a solution of ammonium molybdate, respectively. This catalyst, identified hereinafter as Catalyst D, was found to contain 2.52 weight percent CoO and 9.46 weight percent $MoO_3$.

A physical mixture of (1) Catalyst C and (2) CoO and (3) $MoO_3$ was prepared. An 8.7-gram portion of Catalyst C was physically admixed with 0.3 gram of CoO and 1.0 gram of $MoO_3$. The three components were placed in a mortar and ground together with a pestle to form a well-mixed, thoroughly blended composition. This composition, identified hereinafter as Catalyst E, was prepared to contain 10 weight percent $MoO_3$, 3 weight percent CoO, and 87 weight percent Catalyst C.

A catalyst was prepared by impregnating a portion of Catalyst C in the laboratory with a solution of cobalt and molybdenum. An 8.7-gram portion of Catalyst C was impregnated with a solution prepared by dissolving 1.0 gram of $MoO_3$ in 15 milliliters of a dilute ammonium hydroxide solution, adjusting the pH to about 6, and then dissolving 1.0 gram of $Co(C_2H_3O_2)_2 \cdot 4H_2O$ in the solution. The impregnated material was dried at room temperature in static air for at least 16 hours and subsequently calcined in static air for 2 hours at a temperature of about 450° C. (842° F.). This catalyst, identified hereinafter as Catalyst F, was prepared to contain 3.0 weight percent CoO, 10.0 weight percent $MoO_3$, 56.5 weight percent alumina, and 30.5 weight percent ultrastable, large-pore crystalline aluminosilicate material.

A catalyst was prepared according to the method of preparation of the present invention wherein the hydrogenation metals impregnated on the inorganic oxide are sulfided before the aluminosilicate material is blended therewith. A 565-gram portion of an alumina sol, containing 10 weight percent alumina solids and obtained from the American Cyanamid Company, was placed in a high-speed blender. A molybdenum-containing solution was prepared by dissolving 10 grams of $NoO_3$ in a dilute ammonium hydroxide solution. The pH of the molybdenum-containing solution was adjusted to about 7 by adding dilute nitric acid. A cobalt-containing solution was prepared by dissolving 10 grams of $Co(C_2H_3O_2)_2 \cdot 4H_2O$ in warm distilled water (about 180°-200° F.). Both of these solutions were added to the alumina sol in the blender, the cobalt-containing solution being added first. The solutions and the alumina sol were thoroughly blended. Then cylinder hydrogen sulfide gas was passed through the blend for one-half hour at a rate of about 200 to 300 cubic centimeters per minute at a temperature of about '° C. (104° F.) while mixing was continued. A 30.5-gram portion of ultrastable, large-pore crystalline aluminosilicate material, previously cation exchanged with a solution of ammonium chloride, thoroughly washed with warm distilled water, dried in static air at room temperature for at least 16 hours, and calcined in static air for about 2 hours at a temperature of 500° C. (932° F.), was added to the blend and thoroughly mixed therewith. The aluminosilicate material was added as finely divided particles. The blend was then gelled by the addition of a very dilute solution of ammonium hydroxide. The gel was dried in static air at room temperature for at least 16 hours, and calcined in static air for 2 hours at a temperature of about 500° C. (932° F.). This composition, hereinafter identified as Catalyst G, was prepared to contain 3.0 weight percent CoO, 10.0 weight percent $MoO_3$, 30.5 weight percent ultrastable, large-pore crystalline aluminosilicate material, and 56.5 weight percent alumina.

A catalyst was prepared by impregnating a high-alumina silica-alumina cracking catalyst with $MoO_3$. The impregnating solution was prepared by dissolving 2.22 grams of $MoO_3$ in a sufficient volume of very dilute ammonium hydroxide solution to make 25 milliliters of solution. This molybdenum-containing solution was used to impregnate 20.0 grams of HA–1 silica-alumina cracking catalyst (about 25 weight percent alumina) obtained from the Nalco Chemical Company. The impregnated material was dried in static air at a temperature of about 90° C. (194° F.) for about 3 hours and then was calcined in static air at a temperature of about 500° C. (932° F.) for a period of about 1 hour. This catalyst, identified hereinafter as Catalyst H, was prepared to contain 10.0 weight percent $MoO_3$ and 90.0 weight percent silica-alumina.

A catalyst was prepared by impregnating ultrastable, large-pore crystalline aluminosilicate material with $MoO_3$. The impregnating solution was prepared by dissolving 0.44 grams of $MoO_3$ in about 10 to 12 milliliters of dilute ammonium hydroxide solution. A 4-gram portion of ultrastable, large-pore crystalline aluminosilicate material, previously cation-exchanged with a solution of ammonium chloride, thoroughly washed with warm distilled water to remove anions, dried in static air at room temperature for at least 16 hours, and calcined in static air for 2 hours at 500° C. (932° F.), was impregnated with the molybdenum-containing solution. The impregnated material was dried in static air at room temperature for at least 16 hours and subsequently calcined for 1 hour in static air at a temperature of 450° C. (842° F.). This catalyst, hereinafter identified as Catalyst I, was prepared to contain 10.0 weight percent $MoO_3$ and 90.0 weight percent ultrastable, large-pore crystalline aluminosilicate material.

A catalyst was prepared by impregnating a high-alumina silica-alumina cracking catalyst with a solution of cobalt acetate. A solution was prepared by dissolving 2.05 grams of $Co(C_2H_3B2)_2 \cdot 4H_2O$ in warm distilled water to make about 30 ml. of solution. This solution was used to impregnate 20.0 grams of HA–1 silica-alumina cracking catalyst (about 25 weight percent alumina) obtained from the Nalco Chemical Company. The impregnated material was dried in static air for about 3 hours at a temperature of about 80° C. (176° F.) to about 90° C. (194° F.) and was subsequently calcined in static air for 1 hour at a temperature of 450° C. (842° F.). This catalyst, hereinafter identified as Catalyst J, was prepared to contain 3.0 weight percent CoO and 97.0 weight percent silica-alumina cracking catalyst.

A catalyst was prepared by impregnating ultrastable, large-pore crystalline aluminosilicate material with a cobalt acetate solution. A solution was prepared by dissolving 0.41 g. of $Co(C_2H_3B2)_2 \cdot 4H_2O$ in sufficient distilled water to make 10 ml. of solution. This solution was used to impregnate a 4-gram portion of ultrastable, large-pore crystalline aluminosilicate material which had been cation-exchanged previously with a solution of ammonium chloride, thoroughly washed with warm distilled water to remove anions, dried in static air at room temperature for at least 16 hours, and calcined in static air for about 2 hours at a temperature of 500° C. (932° F.). The impregnated material was dried in static air for about 3 hours at a temperature of about 80° C. (176° F.) and was calcined subsequently for 1 hour in static air at a temperature of 450° C. (842° F.). This catalyst, hereinafter identified as Catalyst K, was prepared to contain 3.0 weight percent CoO and 97.0 weight percent ultrastable, large-pore crystalline aluminosilicate material.

Each of the above nine catalyst samples was subjected to X-ray diffraction analyses. The measurements were obtained with a General Electric XRD–5 diffractometer employing nickel-filtered copper K radiation.

Catalysts, C,D,E,F,G,I, and K all gave strong X-ray reflections at angles where ultrastable, large-pore crystalline aluminosilicate material reflects. Catalyst E, in addition, gave strong reflection patterns for cobalt oxide and molybdenum trioxide. These strong reflection patterns indicate the presence of large crystallites. The X-ray diffraction analyses also showed a small peak at 6.27 Angstrom in the patterns for Catalyst D,F,I, and K. However, this latter peak was not present in the X-ray reflection patterns for Catalysts C,E,G,H, and J. In each of Catalysts D,F,I, and K, the ultrastable, large-pore crystalline aluminosilicate material, as well as the hydrogenation metals, was present, and each of these catalysts was prepared by conventional impregnation techniques. In each of Catalysts, C,H, and J, either both hydrogenation metals or the ultrastable, large-pore crystalline aluminosilicate material was not present. In Catalyst G, both hydrogenation metals and the ultrastable, large-pore crystalline alumino-silicate material were present. However, Catalyst G did not create the 6.27 Angstrom peak. This Catalyst G was the only catalyst that was prepared by the method of preparation of the present invention. Catalyst E was merely a physical mixture of the various components and did not employ conventional impregnation in its preparation.

The results of these X-ray diffraction analyses are summarized in table V below.

TABLE V.—X-RAY DIFFRACTION RESULTS

| Catalyst | Composition | | | | | X-ray reflections | | | |
|---|---|---|---|---|---|---|---|---|---|
| | CoO | MoO₃ | USAM[1] | SiO₂-Al₂O₃ | Al₂O₃ | USAM[1] | CoO | MoO₃ | 6.27 A. |
| C | | | X | | X | X | | | |
| D | X | X | X | X | | X | | | X |
| E | X | X | X | | X | X | X | X | |
| F | X | X | X | | X | X | | | X |
| G | X | X | X | | X | X | | | |
| H | | X | | X | | | | | |
| I | X | X | | | | X | | | X |
| J | X | | | X | | | | | |
| K | X | | X | | | X | | | X |

[1] Ultrastable, large-pore crystalline aluminosilicate material.

These data show that with each catalyst containing at least one of the hydrogenation metals and the ultrastable, large-pore crystalline aluminosilicate material, with the exception of Catalysts E and G, the small peak at 6.27 Angstroms appeared. Catalyst E was a physical mixture and was not prepared by impregnation. Catalyst G was prepared by the method of the present invention and was not prepared through the use of impregnation It is to be noted that the particular X-ray peak at 6.27 Angstroms appears also in the X-ray reflection patterns for Y-type aluminosilicate material that has been cation-exchanged with a material such as silver, barium, calcium or cerium. This particular X-ray peak is not observed when such aluminosilicate material is cation-exchanged with either hydrogen or ammonium cations, or is left in the sodium form.

From the above information, it can be theorized that when the ultrastable, large-pore crystalline aluminosilicate material is impregnated with cobalt and/or molybdenum, there occurs an interaction between these hydrogenation metals and the aluminosilicate material. However, when the hydrogenation metals are initially introduced into a sol of the inorganic oxide, such as alumina or silica-alumina, and the metals are sulfided prior to the addition of the ultrastable, large-pore crystalline aluminosilicate material, no interaction occurs between the hydrogenation components and the aluminosilicate material.

While it is not known what this interaction might be, there is a belief that it involves cation-exchange, since a similar peak is found when Y-type aluminosilicate material has been cation-exchanged. It is suggested that the method of catalyst preparation of the present invention results in a thorough dispersion of the hydrogenation metals throughout the catalytic composition without detectable interaction between the hydrogenation metals and the aluminosilicate material. The absence of strong CoO and MoO₃ reflections suggests the presence of small crystallites in this catalyst.

The above theory is presented in this application to facilitate the understanding of the present invention and is not intended to limit the scope of the present invention.

The presence of the small peak at 6.27 Angstrom in the aluminosilicate material-containing catalysts prepared by conventional impregnation techniques and the absence of such a peak in the catalyst prepared by the method of the present invention provide an indication that these catalysts are different from one another. Perhaps, this may help explain why two catalysts having the same composition, but one having been prepared by conventional techniques and one having been prepared by the method of this invention, produce different results when employed to convert petroleum hydrocarbons.

These catalysts possess different activities; the catalyst prepared by the method of the present invention furnishes improved activity.

It is to be understood that the above examples are for the purpose of illustration only and are not to be regarded as a limitation of the present invention.

It should be said that in the preparation of the catalyst of this invention, the hydrogenation metals may be added to the silica-alumina sol simultaneously by means of a single solution, or each of them may be added by means of its own individual solution. The drying of the various catalyst compositions may be achieved in a vacuum, by means of a flowing gas, or other suitable means. However, the drying should be performed to reduce moisture content of the material that is to be dried to a level within the rage between about 10 and 40 percent by weight.

What is claimed is:

1. A catalytic composition comprising an amorphous silica-alumina support having dispersed therein a metallic hydrogenation component and an ultrastable, large-pore crystalline aluminosilicate material, said aluminosilicate material being substantially free of metal cations and being characterized by a maximum cubic unit cell dimension of about 24.55 Angstrom units, hydroxyl infrared bands near 3,700 cm.[11] and near 3,625 cm.[11], an alkali metal content of less than 1 weight percent, and a superior ability to withstand elevated temperatures and repeated wetting-drying cycles, and said catalytic composition being prepared by the method which comprises: adding ions of said metallic hydrogenation component to a silica-alumina sol to form a first composition; stirring said first composition while adjusting the pH of said first composition to the value between about 5 and about 10; precipitating the sulfide of said metallic hydrogenation component to form a second composition; adding to said second composition said aluminosilicate material in a finely divided state to form a third composition; rapidly blending said third composition to form a blended third composition; drying said blended third composition to form a dried composition having a moisture content between about 10 percent by weight and about 40 percent by weight and calcining said dried composition.

2. The catalytic composition of claim 1 wherein said metallic hydrogenation component is a mixture of the oxides of a metal of Group VIA of the Periodic Table of elements and at least one metal of Group VIII of the Periodic Table.

3. A catalytic composition consisting essentially of an amorphous silica-alumina support having dispersed therein an ultrastable, large-pore, crystalline aluminosilicate material and a metal of Group VIA and a metal of Group VII of the Periodic Table of Elements, said aluminosilicate material being substantially free of metal cations are being characterized by a maximum cubic unit cell dimension of about 24.55 Angstrom units, hydroxyl infrared bands near 3,700 cm.[11] and near 3,625 cm.[11], an alkali metal content of less than 1 weight percent, and a superior ability to withstand elevated temperatures and repeated wetting-drying cycles, and said catalytic composition being prepared by the method which comprises: adding ions of said metal of Group VIA and ions of said metal of Group VIII to a silica-alumina sol to form a first composition; stirring said first composition while adjusting the pH of said first composition to a value between about 5 and about 10; precipitating the sulfides of said metal of Group VIA and said metal of Group VIII to form a second composition; adding to said second composition said aluminosilicate material in a finely divided state to form a third composition; rapidly blending said third composition to form a blended third composition; drying said blended third composition to form a dried composition having a moisture content between about 10 percent by weight and about 40 percent by weight; and calcining said dried composition.

4. The catalytic composition of claim 3 wherein said silica-alumina sol is a low-alumina silica-alumina sol.

5. The catalytic composition of claim 3 wherein said metal of Group VIA is molybdenum and said metal of Group VII is cobalt.

6. The catalytic composition of claim 5 wherein said cobalt is present as 2 to 5 percent by weight of CoO, said molybdenum is present as 4 to 15 percent by weight of $MoO_3$, and wherein said aluminosilicate material is present in an amount between about 5 and about 50 percent by weight, based on the total weight of said catalytic composition.

7. The catalytic composition of claim 6 wherein said aluminosilicate material is present in an amount between about 10 and about 40 percent by weight.

8. A method of preparing a catalyst for the conversion of petroleum hydrocarbon fractions, said catalyst comprising an amorphous silica-alumina support having dispersed therein an ultrastable, large-pore, crystalline aluminosilicate material and a metal of Group VIA and at least one metal of Group VIII of the Periodic Table of Elements, said aluminosilicate material being characterized by a maximum cubic unit cell dimension of about 24.55 Angstrom units, hydroxyl infrared bands near 3,700 cm.[11] and near 3,625 cm.[11], an alkali metal content of less than 1 weight percent, and a superior ability to withstand elevated temperatures and repeated wetting-drying cycles and being substantially free of metal cations, which method comprises: adding ions of said metal of Group VIA and ions of said metal or metals of Group VIII to a silica-alumina sol to form a first composition; stirring said first composition while adjusting the pH of said first composition to a value between about 5 and 10; precipitating the sulfides of said metal of Group VIA and said metal or metals of Group VIII to form a second composition; adding to said second composition said aluminosilicate material in a finely divided state to form a third composition; rapidly blending said third composition to form a blended third composition; drying said blended third composition to form a dried composition having a moisture content between about 10 percent by weight and about 40 percent by weight; and calcining said dried composition.

9. The catalyst-preparation method of claim 8 wherein said metal of Group VIA is molybdenum and wherein only one metal of Group VIII is used and said metal of Group VIII is cobalt.

10. The catalyst-preparation method of claim 8 wherein said precipitating is accomplished by adding to said first composition a member selected from the group consisting of hydrogen sulfide and an aqueous solution of ammonium polysulfide.

11. The catalyst-preparation method of claim 9 wherein said dried material is formed into pellets prior to said calcining.

12. The catalyst-preparation method of claim 9 wherein said calcining is performed at a temperature between about 900° F. and about 1,100° F. for at least 30 minutes.

13. The catalyst-preparation method of claim 9 wherein said dried composition is gradually heated to the temperature of said calcining over a period of at least 1 hour prior to said calcining.

14. A process for converting to a lower boiling product a nitrogen-contaminated gas oil containing a substantial amount of cyclic hydrocarbons, which process comprises contacting said gas oil with the catalytic composition of claim 2 under hydrocracking conditions, including an average temperature between about 650° F. and about 825° F.

15. A process for converting to a lower boiling product a nitrogen-contaminated gas oil containing a substantial amount of cyclic hydrocarbons, which process comprises contacting said gas oil under hydrocracking conditions, including an average temperature between about 650° F. and about 825° F., with a catalytic composition consisting essentially of an amorphous silica-alumina support having dispersed therein an ultrastable, large-pore, crystalline aluminosilicate material and a metal of Group VIA and a metal of Group VIII of the Periodic Table of Elements, said aluminosilicate material being substantially free of metal cations and being characterized by a maximum cubic unit cell dimension of about 24.55 Angstrom units, hydroxyl infrared bands near 3,700 cm.[11] and near 3,625 cm.[11], an alkali metal content of less than 1 weight percent, and a superior ability to withstand elevated temperatures and repeated wetting-drying cycles, and said catalytic composition being prepared by the method which comprises: adding ions of said metal of Group VIA and ions of said metal of Group VIII to a silica-alumina sol to form a first composition; stirring said first composition while adjusting the pH of said first composition to a value between about 5 and 10; precipitating the sulfides of said metal of Group VIA and said metal of Group VIII to form a second composition; adding to said second composition said aluminosilicate material in a finely divided state to form a third composition; rapidly blending said third composition to form a blended third composition; drying said blended third composition to form a dried composition having a moisture content between about 10 percent by weight and about 40 percent by weight; and calcining said dried composition.

16. A process for converting to a lower boiling product a nitrogen-contaminated gas oil containing a substantial amount of cyclic hydrocarbons, which process comprises contacting said gas oil with the catalytic composition of claim 3 in a hydrocracking reaction zone in the presence of a hydrogen-affording gas under hydrocracking conditions, said hydrocracking conditions including a total hydrocracking pressure between about 700 and about 3,000 p.s.i.g; a hydrogen-to-hydrocarbon ratio between 5,000 SCFB and about 20,000 SCFB; an average catalyst bed temperature within the range between about 650° F. and about 825° F.; and a LHSV within the range between about 0.5 and 5 volumes of hydrocarbon per hour per volume of catalyst.

17. A process for converting to a lower boiling product a nitrogen-contaminated gas oil containing substantial amounts of cyclic hydrocarbons, which process comprises contacting said gas oil with the catalytic composition of claim 5 in a hydrocracking reaction zone in the presence of a hydrogen-affording gas under hydrocracking conditions, said hydrocracking conditions including a total hydrocracking pressure between about 700 and about 3,000 p.s.i.g; a hydrogen-to-hydrocarbon ratio between 5,000 SCFB and about 20,000 SCFB; an average catalyst bed temperature within the range between about 650° F. and about 825° F.; and a LHSV within the range between about 0.5 and 5 volume of hydrocarbon per hour per volume of catalyst.

18. The process of claim 17 wherein said average catalyst bed temperature is within the range between about 680° F. and 800° F.

19. The process of claim 17 wherein said LHSV is within the range between about 1 and about 3 volumes of hydrocarbon per hour per volume of catalyst.

20. The process of claim 17 wherein said hydrogen-to-hydrocarbon ratio is within the range between about 8,000 and about 12,000 SCFB.

21. The process of claim 17 wherein said total pressure is within the range between about 1,000 and 1,800 p.s.i.g.

22. The process of claim 17 wherein said average catalyst bed temperature is within the range between about 680° F. and about 800° F., said LHSV is within the range between about 1 and 3 volumes of hydrocarbon per hour per volume of catalyst, said hydrogen-to-hydrocarbon ratio is within the range between about 8,000 and about 12,000 SCFB, and said total pressure is within the range between about 1,000 and about 1,800 p.s.i.g.

UNITED STATES PATENT OFFICE
CERTIFICATE OF CORRECTION

Patent No. 3,617,509    Dated November 2, 1971

Inventor(s)  Albert L. Hensley, Jr.

It is certified that error appears in the above-identified patent and that said Letters Patent are hereby corrected as shown below:

Column 4, lines 69-75, "$cm^{11}$" should be -- $cm^{-1}$ --.

" 5, line 17, "$10^{110}$" should be -- $10^{-10}$ --.

" 5, line 67, "$Co(CHO_2)2 \cdot 4H_2O$" should be -- $Co(CHO_2)_2 \cdot 4H_2O$ --.

" 5, line 69, "$Ni(C_2H_3O_2)2 \cdot 4H_2$)" should be -- $Ni(C_2H_3O_2)_2 \cdot 4H_2O$ --.

" 6, line 26, "70.3% wt.%" should be -- 70.3 wt.% silica-alumina. --.

" 6, line 40, "carbon" should be omitted.

" 7, line 18, "-3.00" should be --  -3.0 --.

" 7, line 33, "$(NH_4)6Mo_7O_24 \cdot 4H_2O$" should be -- $(NH_4)_6Mo_7O_{24} \cdot 4H_2O$ --.

" 8, line 24, "c6-360°F." should be -- $C_6$-360°F. --.

" 8, line 17, "-3.00" should be --  -3.0 --.

" 9, line 47, "10°C" should be -- 40°C. --.

" 10, lines 26 and 40, "$Co(C_2H_3B2)_2 \cdot 4H_2O$" should be -- $Co(C_2H_3O_2)_2 \cdot 4H_2O$ --.

" 12, line 35, "$cm^{11}$" should be -- $cm^{-1}$ --.

" 12, line 59, "Group VII" should be -- Group VIII --.

" 12, line 64, "$cm^{11}$" should be -- $cm^{-1}$ --.

" 13, line 8, "Group VII" should be -- Group VIII --.

" 13, line 27, "$cm^{11}$" should be -- $cm^{-1}$ --.

UNITED STATES PATENT OFFICE
CERTIFICATE OF CORRECTION

Patent No. 3,617,509     Dated November 2, 1971

Inventor(s) Albert L. Hensley, Jr.

It is certified that error appears in the above-identified patent and that said Letters Patent are hereby corrected as shown below:

Column 14, line 11, "$cm^{11}$" should be -- $cm^{-1}$ --.

" 3, line 68, "feed to" should be -- feet of --.

" 5, line 59, "$(NH_4)Mo_7O_24 \cdot 4H_2)$" should be --$(NH_4)_6Mo_7O_{24} \cdot 4H_2O$ --.

" 6, line 52, "surphur" should be -- sulfur --.

Signed and sealed this 26th day of September 1972.

(SEAL)
Attest:

EDWARD M. FLETCHER, JR.
Attesting Officer

ROBERT GOTTSCHALK
Commissioner of Patents